(12) United States Patent
Endo et al.

(10) Patent No.: US 8,981,704 B2
(45) Date of Patent: Mar. 17, 2015

(54) MOTOR CONTROLLER AND ELECTRIC POWER STEERING DEVICE USING THE SAME

(71) Applicants: Masaya Endo, Chiyoda-ku (JP); Isao Kezobo, Chiyoda-ku (JP); Yoshihiko Kimpara, Chiyoda-ku (JP); Jiro Okada, Chiyoda-ku (JP)

(72) Inventors: Masaya Endo, Chiyoda-ku (JP); Isao Kezobo, Chiyoda-ku (JP); Yoshihiko Kimpara, Chiyoda-ku (JP); Jiro Okada, Chiyoda-ku (JP)

(73) Assignee: Mitsubishi Electronic Corporation, Tokyo (JP)

( * ) Notice: Subject to any disclaimer, the term of this patent is extended or adjusted under 35 U.S.C. 154(b) by 261 days.

(21) Appl. No.: 13/772,703

(22) Filed: Feb. 21, 2013

(65) Prior Publication Data
US 2013/0299271 A1 Nov. 14, 2013

(30) Foreign Application Priority Data
May 9, 2012 (JP) .................................. 2012-107723

(51) Int. Cl.
*H02P 6/00* (2006.01)
*H02P 21/00* (2006.01)
(Continued)

(52) U.S. Cl.
CPC ............... *H02P 6/12* (2013.01); *B62D 5/0409* (2013.01); *B62D 5/0463* (2013.01); *B62D 5/0484* (2013.01); *B62D 5/046* (2013.01); *B62D 5/0487* (2013.01)
USPC .................. 318/724; 318/400.01; 318/400.02; 318/400.04; 318/400.06; 318/490; 318/635; 318/700; 318/801

(58) Field of Classification Search
USPC ............ 318/400.01, 400.02, 400.04, 400.06, 318/400.21, 490, 635, 700, 724
See application file for complete search history.

(56) References Cited

U.S. PATENT DOCUMENTS 5,969,919 A * 10/1999 Kobayashi et al. ............. 361/23
2005/0093499 A1 * 5/2005 Gallagher et al. ............ 318/495
(Continued)

FOREIGN PATENT DOCUMENTS

| JP | 2005-304119 A | 10/2005 |
| JP | 2009-092081 A | 4/2009 |

(Continued)

OTHER PUBLICATIONS

Japanese Office Action (Preliminary Notice of Reasons for Rejection), dated Apr. 1, 2014, Application No. 2012-107723.
Japanese Office Action (Preliminary Notice of Reasons for Rejection), dated Nov. 12, 2013, Application No. 2012-107723.

*Primary Examiner* — Bentsu Ro
*Assistant Examiner* — Gabriel Agared
(74) *Attorney, Agent, or Firm* — Sughrue Mion, PLLC; Richard C. Turner

(57) ABSTRACT

Provided are a motor controller for suppressing a torque pulsation with a simple configuration and obtaining a sufficient output torque in the case of an open-type fault occurring in any one of windings of a motor and inverters, and an electric power steering device using the motor controller. In the motor controller for controlling a current supplied from and a voltage applied from a power source with respect to the motor including winding sets of a plurality of systems, when a fault determination unit (31) determines the occurrence of the open-type fault, the supply of the currents to the windings of one of the systems in which the fault has occurred is stopped by control performed on switching elements included in the inverter of the faulty system, whereas the supply of the currents to the windings of the normal system in which the fault has not occurred is continued.

15 Claims, 5 Drawing Sheets

(51) Int. Cl.

| | | |
|---|---|---|
| *H02P 6/16* | (2006.01) | |
| *H02P 6/06* | (2006.01) | |
| *H02P 7/00* | (2006.01) | |
| *G05B 11/01* | (2006.01) | |
| *H02P 6/12* | (2006.01) | |
| *B62D 5/04* | (2006.01) | |

(56) References Cited

U.S. PATENT DOCUMENTS

| | | | |
|---|---|---|---|
| 2006/0055365 A1* | 3/2006 | Kifuku et al. | 318/806 |
| 2011/0115289 A1* | 5/2011 | Kitamoto | 307/10.1 |
| 2011/0234130 A1* | 9/2011 | Okumura | 318/400.07 |
| 2012/0161681 A1* | 6/2012 | Kuroda | 318/400.21 |
| 2012/0326644 A1* | 12/2012 | Okumura et al. | 318/400.21 |

FOREIGN PATENT DOCUMENTS

| | | |
|---|---|---|
| JP | 2010-178556 A | 8/2010 |
| JP | 2010-252485 A | 11/2010 |
| JP | 2011-131860 A | 7/2011 |
| JP | 2012-085513 A | 4/2012 |
| JP | 2013-038950 A | 2/2013 |

* cited by examiner

MOTOR CONTROLLER AND ELECTRIC POWER STEERING DEVICE USING THE SAME

BACKGROUND OF THE INVENTION

1. Field of the Invention

The present invention relates to a motor controller for controlling a polyphase motor including a plurality of sets of windings and an electric power steering device using the motor controller.

2. Description of the Related Art

As a conventional electric power steering device, there is known an electric power steering device including, in a motor, two sets of windings, two inverters for controlling currents flowing through the respective winding sets, and individual power relays for supplying power from a power source to the respective inverters so that the current flowing through each of the winding sets is individually controllable (for example, see Japanese Patent Application Laid-open No. 2011-131860).

The conventional electric power steering device described in Japanese Patent Application Laid-open No. 2011-131860 cited above is configured as follows. In the case of a fault in one of the winding sets or the inverters, the power relay on the side where the fault has occurred is opened for the disconnection from the power source. The inverter on the normal side is controlled so that a torque is continuously output from the motor.

As described above, a motor controller for controlling a polyphase motor has a possibility of occurrence of the following faults as faults which may occur in the windings or the inverters of the motor. Specifically, the faults include a bridging-type fault (also referred to as a short fault and an ON fault) such as a bridging fault in a switching element, a ground fault in the winding of one of the phases, a ground fault in a wiring which connects the inverter and the winding, and a bridging fault between two phases, and an open-type fault such as disconnection of a wiring of any one of the windings or the inverters, and an open fault in any one of the switching elements included in the inverter.

In the case of the bridging-type fault or the open-type fault as described above, a torque pulsation occurs in a winding driving system in which the fault has occurred.

The conventional motor controller and the electric power steering device using the conventional motor controller do not distinguish the bridging-type fault and the open-type fault from each other in the case where the polyphase motor is controlled in the manner as described in Japanese Patent Application Laid-open No. 2011-131860 cited above. Therefore, in the case of some fault, there is a possibility that an overcurrent or a braking current generated by the bridging fault or the like flows. Therefore, power relays for stopping the faulty winding driving system are required to be provided so as to stop the supply of the currents from the power source to the inverter and the windings of the faulty winding driving system. In addition, a plurality of the power relays are required to be provided so as to correspond to the plurality of inverters. Thus, the number of components increases to make it difficult to downsize the motor controller and the electric power steering device. Further, a control system for turning ON/OFF the power relays is added. As a result, there is a problem in that a system becomes complex.

SUMMARY OF THE INVENTION

The present invention has been made to solve the problems described above, and therefore has an object to provide a motor controller which suppresses a torque pulsation in the case of a fault in any one of windings of a motor and inverters and realizes cost reduction, compact size, and simplification by reducing the number of components, and also provide an electric power steering device using the motor controller.

According to an exemplary embodiment of the present invention, there is provided a motor controller for controlling a current supplied from and a voltage applied from a power source with respect to a motor including a plurality of systems of winding sets, each of the winding sets including a plurality of phases of windings, the motor controller including: inverters of the plurality of systems, each of the inverters including a plurality of switching elements for controlling voltages applied to the respective plurality of phases of the winding sets of the plurality of systems, so as to control currents supplied from the power source to the respective plurality of phases of the winding sets of the plurality of systems; and current control means for generating a plurality of sets of voltage commands corresponding to the applied voltages respectively for the inverters of the plurality of systems, so as to control the currents to be caused to flow in the respective plurality of phases of the winding sets of the plurality of systems, in which: the current control means includes fault determination means for detecting one of disconnection of any one of wirings in the plurality of phases of the winding sets of the plurality of systems and in the inverters of the plurality of systems and an open fault occurring in any one of the plurality of switching elements and for determining whether a fault occurring in any one of the windings and the inverters is an open-type fault or a bridging-type fault when the fault is detected; and when the fault determination means determines that the fault is the open-type fault, the current control means stops the supply of the currents to the windings of one of the plurality of systems in which the open-type fault has occurred, and continues the supply of the currents to the windings of a normal one of the plurality of systems in which the open-type fault has not occurred.

According to the present invention, when it is determined that the content of the fault is the open-type fault at the time of detection of the fault, the faulty system is stopped. Therefore, the open-type fault can be distinguished from the bridging-type fault to allow a stop process corresponding to the open-type fault to be performed. As a result, the torque pulsation is suppressed, while a torque close to that obtained during a normal operation can be realized only by the normal system.

Further, there is no possibility that a harmful torque such as a torque pulsation is generated in the faulty system. In addition, the pulsation is suppressed with a simple configuration. Thus, low cost and small size can be realized.

DETAILED DESCRIPTION OF THE PREFERRED EMBODIMENTS

First Embodiment

Hereinafter a first embodiment of the present invention is described in detail referring to the accompanying drawings.

Figure 1:
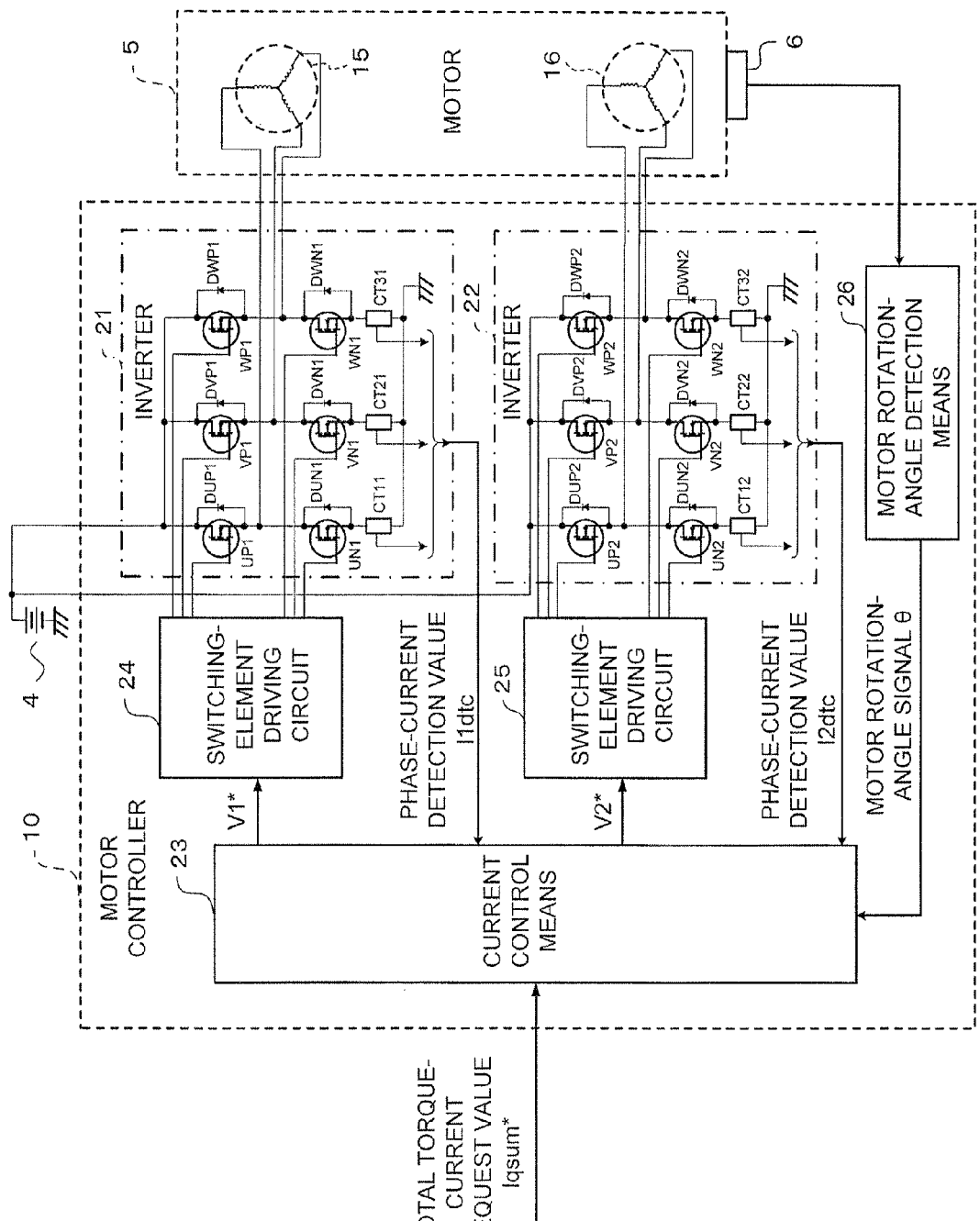
FIG. 1 is a block diagram schematically illustrating an overall configuration of a motor controller according to a first embodiment of the present invention.

FIG. 1 is a block diagram schematically illustrating an overall configuration of a motor controller 10 according to the first embodiment of the present invention.

FIG. 1 illustrates not only the motor controller 10 but also a peripheral configuration relating to the motor controller 10. Specifically, the peripheral configuration includes a power source 4 (for example, an in-vehicle battery), a motor 5, and a motor rotation-angle sensor 6 for detecting a rotation angle of the motor 5.

In FIG. 1, the motor 5 includes a first winding set 15 having three phases, that is, a U1-phase, a V1-phase, and a W1-phase, and a second winding set 16 having three phases, that is, a U2-phase, a V2-phase, and a W2-phase. Each of the winding sets 15 and 16 respectively corresponding to a first system and a second system is obtained by connecting the three phases in star connection.

In the motor 5, a stator (not shown) includes the plurality of winding sets 15 and 16. The motor 5 includes the stator, a rotor (not shown) provided so as to be opposed to the stator, and a rotary shaft (not shown) fixed to the rotor.

The following exemplifies the case where the present invention is applied to a permanent-magnet synchronous motor including permanent magnets provided to the rotor, with each of the winding sets 15 and 16 having three phases. However, the present invention is not limited thereto. It is apparent that the present invention can be used for a motor which is rotationally driven by a polyphase alternating current having three or more phases.

The motor controller 10 uses a total torque-current request value Iqsum* as input information to control a voltage to be applied to each of the winding sets 15 and 16 included in the motor 5. In this manner, power supplied from the power source 4 is fed to the motor 5 to control the current to flow through each of the windings of the winding sets 15 and 16. In this manner, an output torque of the motor, which is approximately proportional to the current, is controlled.

The motor controller 10 includes inverters 21 and 22, switching-element driving circuits 24 and 25, current control means 23, and motor rotation-angle detection means 26. The inverters 21 and 22 and the switching-element driving circuits 24 and 25 control the voltages to be applied to the respective phases of the winding sets 15 and 16 so as to control the current supplied to and the voltage applied to the motor 5 including the two-system winding sets 15 and 16. The current control means 23 generates a phase-voltage command V1* output to the switching-element driving circuit 24 and a phase-voltage command V2* output to the switching-element driving circuit 25 in accordance with the total torque-current request value Iqsum*. The motor rotation-angle detection means 26 is connected to the motor rotation-angle sensor 6.

The inverter 21 corresponding to the first system includes, for the respective phases, switching elements UP1, UN1, VP1, VN1, WP1, and WN1, each for controlling the voltage to be applied for each phase, diodes DUP1, DUN1, DVP1, DVN1, DWP1, and DWN1 which are connected in inverse-parallel to the respective switching elements, and current detection circuits CT11, CT21, and CT31 for generating a phase-current detection value I1$dtc$. Similarly, the inverter 22 corresponding to the second system includes, for the respective phases, switching elements UP2, UN2, VP2, VN2, WP2, and WN2, each for controlling the voltage to be applied for each phase, diodes DUP2, DUN2, DVP2, DVN2, DWP2, and DWN2 which are connected in inverse-parallel to the respective switching elements, and current detection circuits CT21, CT22, and CT32 for generating a phase-current detection value I2$dtc$. With this configuration, the supply currents to the respective phases for each of the winding sets 15 and 16 are controlled.

In the motor controller 10, the motor rotation-angle detection means 26 calculates a motor rotation-angle signal θ from the value detected by the motor rotation-angle sensor 6 and inputs the calculated motor rotation-angle signal θ to the current control means 23.

Here, the motor rotation-angle sensor 6 and the motor rotation-angle detection means 26 are provided to obtain the motor rotation-angle signal θ. However, the motor rotation-angle signal θ may also be obtained based on a motor rotation angle estimated by commonly performed estimation computation means.

In the motor controller 10, the current detection circuits CT11, CT21, and CT31 included in the inverter 21 and the current detection circuits CT12, CT22, and CT32 included in the inverter 22 detect the phase currents flowing in the respective phases of the motor 5 to obtain phase-current detection values Iu1$dtc$, Iv1$dtc$, Iw1$dtc$, Iu2$dtc$, Iv2$dtc$, and Iw2$dtc$.

In FIG. 1, the phase-current detection values Iu1$dtc$, Iv1$dtc$, and Iw1$dtc$ of the first winding set 15 are collectively illustrated as the phase-current detection value I1$dtc$.

Similarly, the phase-current detection values Iu2$dtc$, Iv2$dtc$, and Iw2$dtc$ of the second winding set 16 are collectively illustrated as the phase-current detection value I2$dtc$.

The current control means 23 determines the phase-voltage commands V1* and V2* in accordance with the total torque-current request value Iqsum* corresponding to a torque target value to be generated by the motor 5, the phase-current detection values I1$dtc$ and I2$dtc$ of the respective phases of the motor 5, and the motor rotation-angle signal θ. The details thereof are described later.

The switching-element driving circuit 24 on the first system side performs PWM modulation on the phase-voltage command V1* to instruct the inverter 21 to perform a switching operation.

As a result, in response to the switching-operation signal, the inverter 21 performs chopper control on the switching elements UP1, VP1, WP1, UN1, VN1, and WN1 to cause the currents to flow in the respective phases U1, V1, and W1 of the first winding set 15 included in the motor 5 by the power supplied from the power source 4.

Similarly, the switching-element driving circuit 25 and the inverter 22 on the second system side cause the currents to flow in the respective phases U2, V2, and W2 of the second winding set 16 included in the motor 5 in accordance with the phase-voltage command V2*. The inverter 21 corresponds to the first winding set 15, whereas the inverter 22 corresponds to the second winding set 16.

Figure 2:
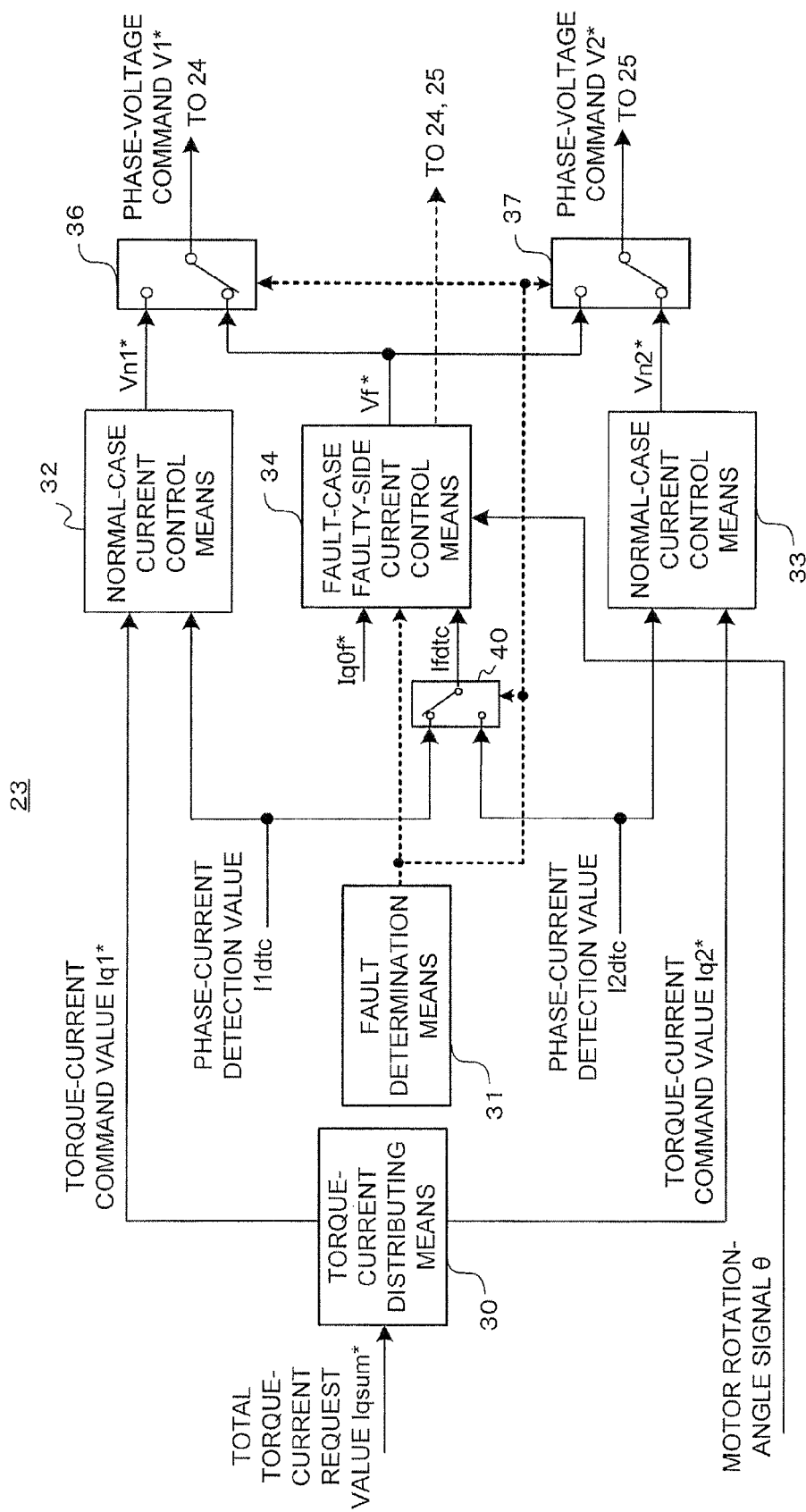
FIG. 2 is a block diagram illustrating a functional configuration of current control means according to the first embodiment of the present invention.

Next, the current control means 23 according to the first embodiment of the present invention is described referring to FIG. 2.

FIG. 2 is a block diagram illustrating a functional configuration of the current control means 23 according to the first embodiment of the present invention.

The current control means 23 includes torque-current distributing means 30, fault determination means 31, normal-case current control means 32 and 33 respectively corresponding to the first system and the second system, faulty-side current control means 34 in the case of fault (hereinafter referred to as "fault-case faulty-side current control means 34"), and switching means 36, 37, and 40, each having two input terminals and one output terminal.

The torque-current distributing means 30 distributes the total torque-current request value Iqsum* to the first system side (the inverter 21 and the first winding set 15) and the second system side (the inverter 22 and the second winding set 16).

The fault determination means 31 detects a fault occurring in each of the inverters 21 and 22 or each of the winding sets 15 and 16 and also determines the content of the fault (described below) so as to output the result of faulty-system determination or the result of specification of a bridging fault portion (described below), as a determination result (indicated by dashed arrows).

Although the illustration is herein omitted to avoid complication, the voltage signal of the power source 4, the motor rotation-angle signal θ, the phase-current detection values I1dtc and I2dtc, and the phase-voltage commands V1* and V2* are input to the fault determination means 31 as input information for determination of the fault.

The normal-case current control means 32 and 33 perform general current control which is used during the normal operation, whereas the fault-case faulty-side current control means 34 is used for the inverter and the winding set of one of the systems in which the fault has occurred in the case of a fault.

The switching means 36 is inserted to the output terminal side of the phase-voltage command V1*, whereas the switching means 37 is inserted to the output terminal side of the phase-voltage command V2*. The switching means 36 selects a normal-case phase-voltage command Vn1* or a fault-case faulty-side phase-voltage command Vf* in accordance with the determination result from the fault determination means 31 to output the selected result as the phase-voltage command V1*. Similarly, the switching means 37 selects a normal-case phase-voltage command Vn2* or the fault-case faulty-side phase-voltage command Vf* in accordance with the determination result from the fault determination means 31 to output the selected result as the phase-voltage command V2*.

The switching means 40 is inserted to the input terminal side of the fault-case faulty-side current control means 34 to select one of the phase-current detection values I1dtc and I2dtc in accordance with the determination result from the fault determination means 31 and input the selected phase-current detection value to the fault-case faulty-side current control means 34.

In the manner described above, in the case of a fault, of the two systems, that is, one system including the first winding set 15 and the inverter 21 and another system including the second winding set 16 and the inverter 22 (hereinafter also referred to as "first winding driving system" and "second winding driving system"), the current control means 23 uses the fault-case faulty-side current control means 34 to perform control on the winding driving system in which the fault has occurred (hereinafter also referred to as "faulty winding driving system").

The total torque-current request value Iqsum* is divided by the torque-current distributing means 30 into torque-current command values Iq1* and Iq2* as torque request values which are desired to be generated respectively in the first winding driving system and the second winding driving system.

In this case, each of the torque-current command values Iq1* and Iq2* is set to a half value of the total torque-current request value Iqsum*. Specifically, the torque-current command values are set so that equal torques are generated in the two systems to obtain the target output torque by the sum of the torques.

Next, the normal-case current control means 32 of the first winding driving system generates the normal-case phase-voltage command Vn1* based on the torque-current command value Iq1* and the phase-current detection value I1dtc to input the generated normal-case phase-voltage command Vn1* to one of the input terminals of the switching means 36.

During the normal operation, the switching means 36 selects and inputs the normal-case phase-voltage command Vn1* to the switching-element driving circuit 24 as the phase-voltage command V1*.

Similarly, the normal-case current control means 33 of the second winding driving system generates the normal-case phase-voltage command Vn2* based on the torque-current command value Iq2* and the phase-current detection value I2dtc to input the generated normal-case phase-voltage command Vn2* to one of the input terminals of the switching means 37.

During the normal operation, the switching means 37 selects and inputs the normal-case phase-voltage command Vn2* to the switching-element driving circuit 25 as the phase-voltage command V2*.

Each of the normal-case current control means 32 and 33 has a configuration which is described in, for example, a known document (WO 2005/091488, FIG. 19) and realizes the smooth generation of the motor torque by performing known dq control during the normal operation.

The torque-current command value Iq1* obtained by the distribution is used for the dq control as a q-axis current command.

Here, the q-axis current is a current component proportional to the torque and is herein also referred to as a torque current.

Another current, that is, a d-axis current for controlling a field magnetic flux is herein controlled to zero. However, another value may be used for the d-axis current.

Although the motor rotation-angle signal θ is not input to the normal-case current control means 32 and 33 in FIG. 2, the motor rotation-angle signal θ may be input to the normal-case current control means 32 and 33 so as to be used for coordinate transform which is generally performed in the dq control. Similarly, although the motor rotation-angle signal θ is not input to the fault-case faulty-side current control means 34, the motor rotation-angle signal θ may be input thereto.

As described above, the torque currents of the first winding driving system and the second winding driving system are realized so as to follow the torque-current command values Iq1* and Iq2* through the normal-case current control means 32 and 33 and the switching means 36 and 37 during the normal operation. As a result, a desired output torque can be obtained.

Next, the fault determination means 31 is described.

When a fault occurs in any one of the first winding set 15 and the second winding set 16 or any one of the inverters 21 and 22, the fault determination means 31 determines whether the fault is an open-type fault or a bridging-type fault.

Here, the open-type fault indicates the disconnection of a wiring in any one of the first winding set 15 and the second winding set 16 or any one of the inverters 21 and 22, or an open fault in any one of the switching elements included in the inverters 21 and 22.

On the other hand, the bridging-type fault indicates a bridging fault in any one of the switching elements included in the inverters 21 and 22, a ground fault in the winding of one of the phases included in any one of the first winding set 15 and the second winding set 16, a ground fault in any one of the wirings connecting the inverter 21 and the first winding set 15 and connecting the inverter 22 and the second winding set 16, or a bridging fault between two phases.

In order to realize the function of determining the open-type fault by the fault determination means 31, a configuration described in, for example, a known document (Japanese Patent Application Laid-open No. 2007-244028, FIG. 2) may be used.

In this manner, one of the two winding driving systems in which the fault has occurred can be specified. Further, the fault can be specified as the open-type fault.

As described above, the fault determination means 31 detects the fault and also outputs the faulty-system determination result (indicated by dashed arrows) indicating whether the system in which the open-type fault has occurred is the first winding driving system or the second winding driving system.

Next, a schematic operation in the case of an open-type fault is described. As an example, the case where the open-type fault occurs in the first winding driving system is representatively described below. However, a similar operation is performed even in the case of an open-type fault in the second winding driving system only except that a signal to be selected by each of the switching means is changed.

Assuming that the open-type fault occurs in the first winding driving system, the fault determination means 31 outputs the faulty-system determination result indicating that the open-type fault has occurred in the first winding driving system.

Subsequently, the fault-case faulty-side current control means 34 computes the fault-case faulty-side phase-voltage command Vf* based on input information, including a set fault-case faulty-side command current Iq0f*, a faulty-side phase-current detection value Ifdtc of the faulty winding driving system, which is selected by the switching means 40 in response to the faulty-system determination result, and the motor rotation-angle signal θ, so that the q-axis current of the faulty winding driving system (first winding driving system) follows the fault-case faulty-side command current Iq0f*. Then fault-case faulty-side current control means 34 the inputs the computed fault-case faulty-side phase-voltage command Vf* to another of the input terminals of the switching means 36.

The switching means 36 switches a contact to the position illustrated in FIG. 2 in response to the faulty-system determination result and inputs the fault-case faulty-side phase-voltage command Vf* computed by the fault-case faulty-side current control means 34 to the switching-element driving circuit 24 of the faulty winding driving system (first winding driving system) as the phase-voltage command V1* of the faulty winding driving system.

In this case, the fault-case faulty-side command current Iq0f* is set to zero.

As a result, each of the phase currents of the faulty winding driving system is controlled to zero. Therefore, it is possible to perform control for preventing the motor torque from being generated over the entire region of the rotation angle of the motor 5 in the faulty winding driving system.

On the other hand, for the normal winding driving system (second winding driving system), the normal-case phase-voltage command Vn2* is computed in the normal-case current control means 33 so that the q-axis current of the second winding driving system follows the torque-current command value Iq2* obtained by the distribution by the torque-current distributing means 30.

At this time, a contact of the switching means 37 is located at the position illustrated in FIG. 2. Therefore, the switching means 37 selects the normal-case phase-voltage command Vn2* as the phase-voltage command V2* and then inputs the selected phase-voltage command V2* to the switching-element driving circuit 25 of the normal winding driving system.

As a result, in the normal winding driving system, the torque current follows the torque-current command value Iq2* with high precision.

Next, an operation in the case of a bridging-type fault is described.

In order to realize the function of determining the bridging-type fault by the fault determination means 31, a configuration of abnormality detection means and short-circuited portion specifying means described in a known document (WO 2008/129658) may be used.

According to the technology described in WO 2008/129658, when it is determined by the abnormality determination means that some abnormality has occurred in the inverter or the motor, the short-circuited portion specifying means specifies a portion in which the bridging fault has occurred.

At this time, the short-circuited portion specifying means stores a test pattern indicating a predetermined combination for turning ON the switching elements included in the inverter, and specifies the switching element in which the bridging fault has occurred or the phase in which the ground fault or a supply fault has occurred, based on the test pattern, an average voltage of the motor terminals, and a detected current of each phase which flows as a response when the test pattern is implemented.

The technology described in WO 2008/129658 is used for a single winding driving system. For the plurality of winding driving systems, a process by the abnormality detection means may be performed for each of the winding driving systems and then, the short-circuited portion may be specified by using the short-circuited portion specifying means for the winding driving system in which the abnormality has been detected.

In the case of the bridging-type fault, the fault determination means 31 outputs the faulty-system determination result and the result of specification of the bridging fault portion as the determination results. The faulty-system determination result indicates whether the bridging-type fault has occurred in the first winding driving system or the second winding driving system. The bridging-fault portion specification result indicates the switching element in which the bridging fault has occurred, the phase in which the supply fault or the ground fault has occurred, or the phases between which the bridging fault has occurred.

It is assumed that the bridging-type fault occurs in the first winding driving system. Then, the fault determination means 31 outputs, as the determination results, the faulty-system determination result indicating that the bridging-type fault has occurred in the first winding driving system and the bridging-fault portion specification result indicating the switching element included in the inverter 21 in which the bridging fault has occurred, the phase in which the supply fault or the ground fault has occurred, or the phases between which the bridging fault has occurred.

Subsequently, the fault-case faulty-side current control means 34 instructs the switching-element driving circuit 24 of the winding driving system (first winding driving system), in which it is determined that the bridging-type fault has occurred, to open the switching elements included in the inverter 21 which have the phase corresponding to the phase in which the bridging-type fault has occurred (see the dashed arrow).

As a specific example, when the short-circuit has occurred in the U-phase of the first winding driving system, the fault-case faulty-side current control means 34 instructs the switching-element driving circuit 24 to open the switching elements UP1 and UN1 included in the inverter 21.

Further, the current control means 23 sets the fault-case faulty-side command current Iq0f* for generating, in the faulty winding driving system, a torque with a suppressed brake torque or a torque for acceleration for a quick escape from the range of rotation angle in which the brake torque is generated.

Subsequently, the fault-case faulty-side current control means 34 computes the fault-case faulty-side phase-voltage command Vf* based on input information, including the fault-case faulty-side command current Iq0f*, a faulty-side phase-current detection value Ifdtc of the faulty winding driving system, which is selected by the switching means 40 in response to the faulty-system determination result, and the motor rotation-angle signal θ, so that the q-axis current of the faulty winding driving system (first winding driving system) follows the fault-case faulty-side command current Iq0f*. The fault-case faulty-side current control means 34 then inputs the computed fault-case faulty-side phase-voltage command Vf* to the switching means 36.

The switching means 36 switches the contact position to the position illustrated in FIG. 2 in response to the faulty-system determination result and inputs the fault-case faulty-side phase-voltage command Vf* computed by the fault-case faulty-side current control means 34 to the switching-element driving circuit 24 of the faulty winding driving system as the phase-voltage command V1* of the faulty winding driving system.

As a result, the switching-element driving circuit 24 of the first winding driving system, in which it is determined that the bridging-type fault has occurred, performs chopper control on the switching elements included in the inverter 21 which have the phases in which the bridging-type fault has not occurred, based on the phase-voltage command V1*.

As a specific example, when the short-circuit has occurred in the U-phase of the first winding driving system, the chopper control is performed on the switching elements VP1, WP1, VN1, and WN1 included in the inverter 21.

Next, the effects provided by the motor controller 10 according to the first embodiment of the present invention are specifically described.

In the case of disconnection of any one of the wirings of the windings or the inverters 21 and 22 or the open fault in any of the switching elements included in the inverters 21 and 22 in the motor controller 10 for controlling the polyphase motor, the range of rotation angle in which the motor 5 cannot generate the torque is generated. As a result, a torque pulsation occurs.

In particular, when the motor controller 10 is used for an electric power steering device, there is a problem in that the torque pulsation is transmitted to a driver to cause a feeling of discomfort.

According to the first embodiment of the present invention illustrated in FIGS. 1 and 2, the fault determination means 31 included in the current control means 23 determines the open-type fault of the winding driving system and the faulty winding driving system, and the fault-case faulty-side current control means 34 controls each of the phase currents of the faulty winding driving system to zero in accordance with the determination results. Therefore, the control for preventing the motor torque from being generated over the entire region of rotation angle of the motor 5 (motor torque=0) is enabled. As a result, the occurrence of the torque pulsation in the faulty winding driving system can be prevented.

As a result, when the motor controller 10 according to the first embodiment of the present invention is used for the motor control of the electric power steering device, in particular, the effect of preventing the feeling of discomfort caused by the transmission of the torque pulsation to the driver can be provided.

Further, in the configuration in which the open-type fault and the bridging-type fault cannot be distinguished from each other as in the case of the conventional devices described above, there is a possibility that an overcurrent or a braking current, which is generated as a result of the bridging fault or the like, may flow. Therefore, power relays for stopping the faulty winding driving system are required to be provided so as to stop the current supply from the power source to the faulty inverter and winding.

Specifically, in the conventional devices, the phase currents are controlled to zero even in the case of the bridging fault. Therefore, when each of the phase currents is desired to be controlled to zero by using the switching elements, a closed circuit passing through the short-circuited portion is formed. As a result, the phase currents due to induced electric power flow to generate the brake torque. As a result, a large torque pulsation occurs.

On the other hand, according to the first embodiment of the present invention, the open-type fault is distinguished from the bridging-type fault for the determination of occurrence of the fault. In anticipation of the fact that the overcurrent does not flow when the open-type fault occurs, a process for controlling the phase currents to zero is implemented. Therefore, each of the phase currents supplied to the faulty winding driving system is set to zero only by controlling the switching elements without using the power relays.

As a result, the power relays are not required to be provided between the power source 4 and the inverters 21 and 22 or between the motor 5 and the inverters 21 and 22. As a result, low cost, compact size, and simplification can be realized. In addition, the torque pulsation due to the open fault can be prevented.

Further, in the normal winding driving system, the control during the normal operation can be continued. Therefore, the motor torque can be output while the torque pulsation is suppressed in the faulty winding driving system.

When the motor controller 10 is used for the motor control of the electric power steering device, in particular, the motor torque of the normal winding driving system is continuously output. Therefore, steering assist for the driver can be continued.

Moreover, in the inverter in which the bridging-type fault has occurred, the switching elements corresponding to the phase in which the bridging-type fault has occurred are instructed to be opened. As a result, the overcurrent due to short-circuit can be prevented from being generated.

Further, in the faulty winding driving system, the fault-case faulty-side command current Iq0f* for generating the torque with the suppressed brake torque or the torque for acceleration for a quick escape from the range of rotation angle in which the brake torque is generated is set so as to perform the chopper control on the switching elements of the phases in which the bridging fault has not occurred. As a result, the braking current due to the induced electric power can be prevented from flowing through the closed circuit formed so as to pass through the short-circuited portion. Thus, the brake torque can be suppressed.

Accordingly, the torque pulsation can be prevented from occurring in the faulty winding driving system. As a result, when the motor controller 10 is used for the motor control of the electric power steering device, the feeling of discomfort caused by the transmission of the torque pulsation to the driver can be prevented.

Although the fault-case faulty-side command current $Iq0f^*$ to be input to the fault-case faulty-side current control means 34 is set to zero as the means for setting the current supply to each of the phases of the faulty winding driving system to zero, without using the power relays, the means is not limited thereto.

For example, instead of configuring the fault-case faulty-side current control means 34 with the dq control, control may be individually performed for each phase so that the command current of each phase is set to zero. Even in this case, the current can be similarly controlled to zero without depending on the control configuration.

Moreover, even in the case of the bridging-type fault (at the time of setting of the fault-case faulty-side command current $Iq0f^*$ for chopper control), the fault-case faulty-side current control means 34 may be configured to individually perform control for each phase instead of performing the dq control.

When the fault determination means 31 determines that the open-type fault has occurred and in which winding driving system the fault has occurred, the fault-case faulty-side current control means 34 may instruct the switching-element driving circuit of the winding driving system in which it is determined that the open-type fault has occurred to open the switching elements of the faulty winding driving system (see the dashed arrow).

In this case, it is determined that the fault is not the bridging-type fault but the open-type fault. Therefore, there is no possibility of generation of the closed circuit including the induced electric power. Accordingly, the current supply to each of the phases of the faulty winding driving system can be set to zero.

Even in the above-mentioned configuration, the current supply to each of the phases of the faulty winding driving system is set to zero without using the power relays. Therefore, it is not necessary to provide the power relays between the power source 4 and the inverters 21 and 22 or between the motor 5 and the inverters 21 and 22. As a result, the torque pulsation due to the open fault can be prevented at low cost.

Although the windings of each of the first winding set 15 and the second winding set 16 are connected in star connection in FIG. 1, delta connection may be used instead. Moreover, the case where the two systems are provided as the plurality of winding driving systems has been taken as an example, and the example where each of the systems includes the three-phase windings has been described. However, the number of systems and the number of phases of the windings are not limited thereto. The number of winding driving systems may be three or more, and the number of phases of the windings may be four or more.

It is not necessary to provide a plurality of power relays between the power source 4 and the inverters 21 and 22 (or between the motor 5 and the inverters 21 and 22). However, only one power relay may be provided on the power source 4 side so as to be used as a switch for starting/stopping the winding driving systems during the normal operation. Even in this case, the single power relay is sufficient. Therefore, cost reduction can be realized.

As described above, the motor controller according to the first embodiment (FIGS. 1 and 2) of the present invention includes the inverters 21 and 22 of the plurality of systems, for controlling the currents to be supplied from the power source 4 to the respective phases of the winding sets 15 and 16 of the plurality of systems, which respectively include the plurality of switching elements UP1, UN1, VP1, VN1, and WP1 and UP2, UN2, VN2, WP2, and WN2 for controlling the voltages applied to the respective phases of the winding sets 15 and 16 of the plurality of systems, in order to control the current supplied from the power source 4 and the voltage applied to the motor 5 including the plurality of systems of the winding sets 15 and 16, each including the windings of the plurality of phases, and also includes the current control means 23 for generating the plurality of sets of phase-voltage commands V1* and V2* corresponding to the respective voltages applied to the inverters 21 and 22 of the plurality of systems, in accordance with the plurality of sets of torque-current command values Iq1* and Iq2* corresponding to the currents supplied to the respective phases of the winding sets 15 and 16 of the plurality of systems, which become the generated-torque target value of the motor 5, so as to control the currents to be caused to flow in the respective phases of the winding sets 15 and 16 of the plurality of systems.

The current control means 23 includes the fault determination means 31 for detecting the disconnection of any of the wirings in the respective phases of the winding sets 15 and 16 of the plurality of systems or the inverters 21 and 22 of the plurality of systems or the open fault occurring in any of the plurality of switching elements UP1, UN1, VP1, VN1, WP1, WN1, UP2, UN2, VP2, VN2, WP2, and WN2, and for determining whether the fault occurring in any of the windings and the inverters 21 and 22 is the open-type fault or the bridging-type fault when the fault is detected.

When the fault determination means 31 determines that the fault is the open-type fault, the current control means 23 stops the supply of the currents to the windings of the winding driving system in which the open-type fault has occurred, and continues the supply of the currents to the windings of the normal winding driving system in which the open-type fault has not occurred.

As described above, when it is determined that the fault is not the bridging-type fault but the open-type fault as a result of the determination of the content of the fault at the occurrence of the fault, the process for stopping the faulty winding driving system, which corresponds to the open-type fault, is performed. As a result, the torque pulsation can be suppressed.

Even without providing the power relays between the power source 4 and the inverters 21 and 22 or between the motor 5 and the inverters 21 and 22, a harmful torque (such as the torque pulsation) is not generated in the faulty winding driving system. As a result, the compact and simple configuration can be realized at low cost.

Further, even in the case of a fault, the motor torque close to that obtained during the normal operation can be generated only by the normal winding driving system.

Moreover, when the fault determination means 31 determines that the fault is the open-type fault, the current control means 23 according to the first embodiment of the present invention turns OFF the switching elements included in the inverter in the faulty winding driving system or controls the currents flowing through the windings of the faulty winding driving system to zero. In this manner, the supply of the currents to the windings of the faulty winding driving system is stopped.

Specifically, the current control means 23 distinguishes the open-type fault from the bridging-type fault to determine the occurrence of the open-type fault. In anticipation of the fact that the overcurrent does not flow, the current control means 23 turns OFF the switching elements of only the faulty one of the systems. As a result, the current supply can be stopped safely with the simple configuration. At the same time, the control can be continued only with the normal one of the systems.

Moreover, the stop process corresponding to the open-type fault, which is different from that for the bridging-type fault, is performed so that the supply of the currents to the respective phases of the faulty winding driving system is set to zero only by the control for turning OFF the switching elements (or the control for setting the winding currents to zero). Therefore, it is not necessary to provide the power relays between the power source 4 and the inverters 21 and 22 or between the motor 5 and the inverters 21 and 22. As a result, the torque pulsation due to the open fault can be prevented with the compact and simple configuration at low cost.

Further, in the normal one of the winding driving systems, the control for the normal operation can be continued. Therefore, when the motor controller 10 is used for the electric power steering device, the motor torque is continuously output from the normal one of the winding driving systems. Therefore, steering assist for the driver can be continued.

Moreover, when the fault determination means 31 determines that the fault is the bridging-type fault, the current control means 23 according to the first embodiment of the present invention makes an instruction to turn OFF at least the switching elements corresponding to the phase in which the bridging-type fault has occurred.

As described above, only the safe phases are continuously controlled after the specification of the portion where the fault has occurred. The fault is coped with by the control for suppressing the brake torque or compensation for the generated brake torque by the normal winding driving system. In this manner, the torque pulsation generated by the bridging-type fault can be prevented from occurring.

Moreover, the control for the normal operation can be continued in the normal winding driving system. In the electric power steering device, the motor torque of the normal winding driving system is continuously output. Therefore, the steering assist for the driver can be continued.

Second Embodiment

In the first embodiment (FIG. 2) described above, the currents in the normal winding driving system in the case of the fault are controlled by the normal-case current control means 32 and 33. However, as illustrated in FIG. 3, fault-case normal-side current control means 35 may be additionally provided so that the currents in the normal winding driving system in the case of a fault are controlled by the fault-case normal-side current control means 35 separately from the normal-case current control means 32 and 33 in a way different from the control for the normal operation.

Figure 3:
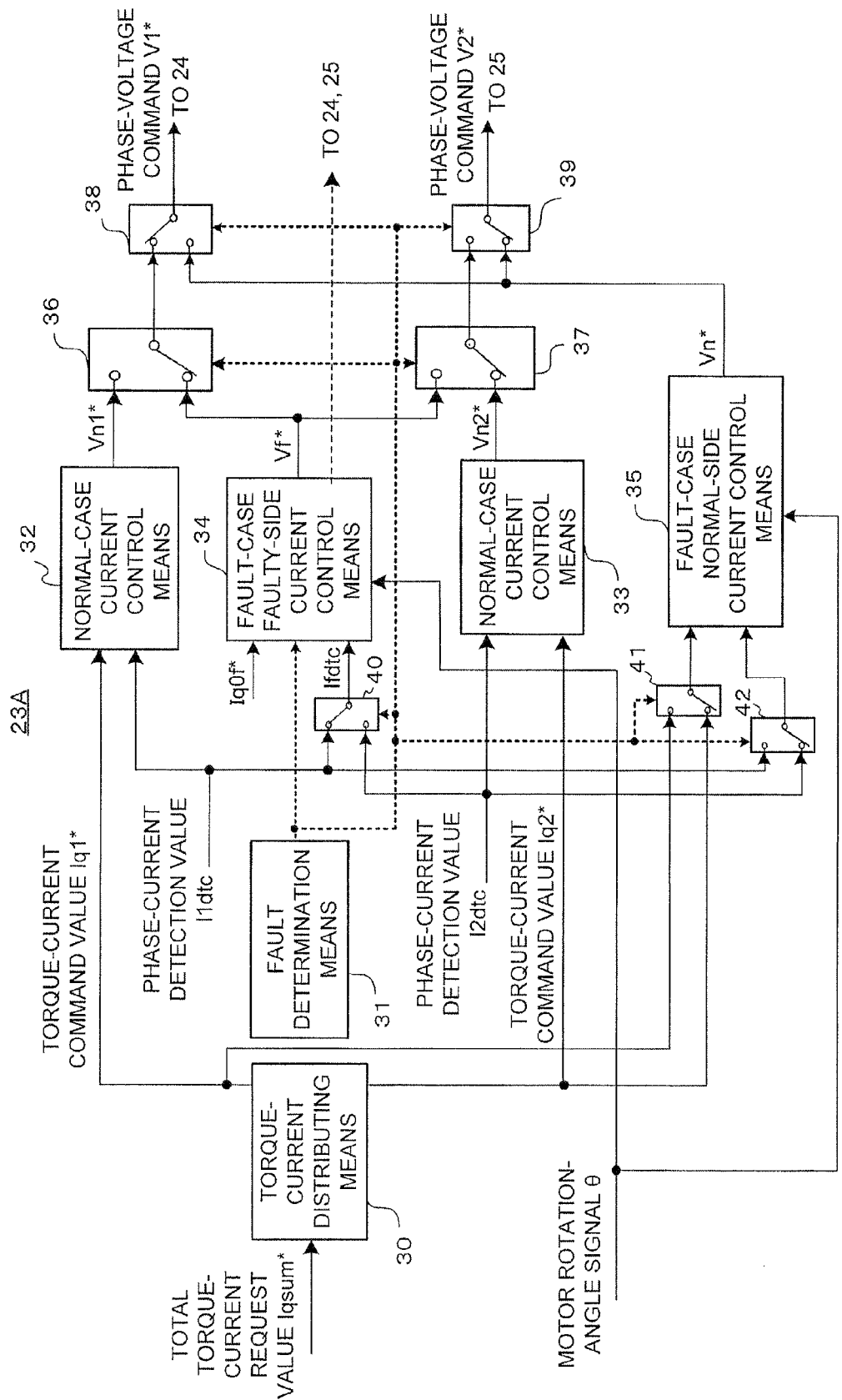
FIG. 3 is a block diagram illustrating a functional configuration of current control means according to a second embodiment of the present invention.

FIG. 3 is a block diagram illustrating a functional configuration of current control means 23A according to a second embodiment of the present invention. The same components as those described above (see FIG. 2) are denoted by the same reference symbols or the same reference symbols followed by "A", and the detailed description thereof is herein omitted.

The overall configuration of the motor controller (not shown) according to the first embodiment of the present invention is as illustrated in FIG. 1.

Hereinafter the second embodiment is described referring to FIG. 3, focusing on the differences from the first embodiment described above.

In this case, besides the configuration described above (FIG. 2), the current control means 23A includes the fault-case normal-side current control means 35, which is arranged in parallel to the normal-case current control means 33, switching means 38 inserted to the output side of the fault-case normal-side current control means 35 and the switching means 36, switching means 39 inserted to the output side of the fault-case normal-side current control means 35 and the switching means 37, and switching means 41 and 42 each inserted to the input side of the fault-case normal-side current control means 35.

In place of the normal-case current control means 33, the fault-case normal-side current control means 35 is used for controlling the currents through the inverter and the winding set of the normal winding driving system in the case of the fault.

Specifically, at the time of occurrence of the open-type fault or the bridging-type fault, the current control is performed on the faulty winding driving system by using the fault-case faulty-side current control means 34, whereas the current control is performed on the normal winding driving system by using the fault-case normal-side current control means 35.

In FIG. 3, similarly to the switching means 36, 37, and 40 described above, each of the switching means 38, 39, 41, and 42 additionally provided in the current control means 23A selects and outputs one of the two input signals in response to the determination result (indicated by the dashed arrows) from the fault determination means 31.

Next, an operation of the current control means 23A according to the second embodiment of the present invention is described.

First, in the normal operation, similarly to the case described above, the normal-case current control means 32 of the first winding driving system outputs the normal-case phase-voltage command Vn1* based on the torque-current command value Iq1* and the phase-current detection value I1$dtc$.

The normal-case phase-voltage command Vn1* is selected as the phase-voltage command V1* through the switching means 36 and 38 and is input to the switching-element driving circuit 24 of the first winding driving system.

Similarly, the normal-case current control means 33 of the second winding driving system outputs the normal-case phase-voltage command Vn2* based on the torque-current command value Iq2* and the phase-current detection value I2$dtc$.

The normal-case phase-voltage command Vn2* is selected as the phase-voltage command V2* through the switching means 37 and 39 and is input to the switching-element driving circuit 24 of the second winding driving system.

Next, an operation performed at the time of occurrence of the open-type fault in the first winding driving system is described.

In this case, similarly to the case described above, the fault-case faulty-side current control means 34 computes the fault-case faulty-side phase-voltage command Vf* based on input information, including the fault-case faulty-side command current Iq0f*, the faulty-side phase-current detection value Ifdtc of the faulty winding driving system, which is selected by the switching means 40 in response to the faulty-system determination result by the fault determination means 31, and the motor rotation-angle signal θ, information so that the q-axis current of the faulty winding driving system follows the fault-case faulty-side command current Iq0f*. The fault-case faulty-side current control means 34 then inputs the computed fault-case faulty-side phase-voltage command Vf* to the switching means 36.

The switching means 36 and 38 switch a contact to the position illustrated in FIG. 3 in response to the faulty-system determination result and input the fault-case faulty-side phase-voltage command Vf* computed by the fault-case faulty-side current control means 34 to the switching-element driving circuit 24 of the faulty winding driving system (first winding driving system) as the phase-voltage command V1* of the faulty winding driving system.

In this case, the fault-case faulty-side command current Iq0f* is set to zero so that each of the phase currents of the faulty winding driving system is controlled to zero. Therefore, the control for preventing the motor torque from being generated over the entire region of rotation angle of the motor 5 is enabled in the faulty winding driving system.

On the other hand, for the normal winding driving system (second winding driving system), a contact of the switching means 41 is switched to a contact position illustrated in FIG. 3 in response to the faulty-system determination result from the fault determination means 31. Therefore, the torque current command value Iq2* of the normal winding driving system is selected to be input to the fault-case normal-side current control means 35.

Moreover, the contact of the switching means 42 is switched to the contact position illustrated in FIG. 3 in response to the faulty-system determination result. Therefore, the phase-current detection value I2dtc of the normal winding driving system is selected to be input to the fault-case normal-side current control means 35.

The fault-case normal-side current control means 35 includes torque-current command value correction means (not shown). The torque-current command value correction means corrects the torque-current command value Iq2* of the normal winding driving system to generate the corrected torque-current command value.

In this manner, the fault-case normal-side current control means 35 uses the corrected torque-current command value and the phase-current detection value I2dtc of the normal winding driving system to perform the dq control in the same manner as performed by the normal-case current control means 32 and 33. Then, the fault-case normal-side current control means 35 computes a fault-case normal-side phase-voltage command Vn* so that the q-axis current of the normal winding driving system follows the corrected torque-current command value and then inputs the computed fault-case normal-side phase-voltage command Vn* to the switching means 38 and 39.

The switching means 39 inputs the fault-case normal-side phase-voltage command Vn* as the phase-voltage command V2* of the normal winding driving system to the switching-element driving circuit 25 of the normal winding driving system.

Next, a specific correction operation performed by the torque-current command-value correction means included in the fault-case normal-side current control means 35 is described.

When the torque-current command value has a margin with respect to a rated current of the winding driving systems to be controlled, the torque-current command-value correction means sets an amplification factor G to a value within the range of $1 \leq G \leq 2$ in accordance with the amount of margin with respect to the rated current so as to amplify the torque-current command value of the normal winding driving system as the corrected torque-current command value.

On the other hand, when the torque-current command value of the normal winding driving system does not have a margin with respect to the rated current of the winding driving systems to be controlled (there is a possibility that the torque-current command value of the normal winding driving system becomes larger than the rated current of the winding driving systems), the torque-current command-value correction means sets the amplification factor G to a value within the range of $0 \leq G < 1$ so as to decrease the torque-current command value of the normal winding driving system to be set as the corrected torque-current command value.

Next, an operation of the current control means 23A at the time of occurrence of the bridging-type fault in the first winding driving system is described.

In this case, the fault determination means 31 outputs, as the determination results, the faulty-system determination result indicating that the bridging-type fault has occurred in the first winding driving system and the bridging-fault portion specification result indicating the switching element included in the inverter 21 in which the bridging fault has occurred, the phase in which the supply fault or the ground fault has occurred, or the phases between which the bridging fault has occurred.

The fault-case faulty-side current control means 34 instructs the switching-element driving circuit 24 of the first winding driving system, in which it is determined that the bridging-type fault has occurred, to open the switching elements included in the inverter 21 which have the phase corresponding to the phase in which the bridging-type fault has occurred (see a dashed arrow).

As a specific example, when the short-circuit has occurred in the U-phase of the first winding driving system, the fault-case faulty-side current control means 34 instructs the switching-element driving circuit 24 to open the switching elements UP1 and UN1 included in the inverter 21.

Further, similarly to the case described above, the fault-case faulty-side current control means 34 computes the fault-case faulty-side phase-voltage command Vf* based on input information, including the fault-case faulty-side command current Iq0f*, the faulty-side phase-current detection value Ifdtc of the faulty winding driving system, which is selected by the switching means 40 in response to the faulty-system determination result by the fault determination means 31, and the motor rotation-angle signal θ, so that the q-axis current of the faulty winding driving system follows the fault-case faulty-side command current Iq0f*.

The switching means 36 and 38 switch a contact to the position illustrated in FIG. 3 in response to the faulty-system determination result and inputs the fault-case faulty-side phase-voltage command Vf* computed by the fault-case faulty-side current control means 34 to the switching-element driving circuit 24 of the faulty first winding driving system as the phase-voltage command V1* of the faulty winding driving system.

The fault-case faulty-side command current Iq0f* is set so as to generate, in the faulty one of the winding driving systems, the torque with the suppressed brake torque or the torque for acceleration for a quick escape from the range of rotation angle in which the brake torque is generated.

On the other hand, for the normal one of the winding driving systems, the switching means 41 selects and inputs the torque-current command value Iq2* of the normal winding driving system to the fault-case normal-side current control means 35 in response to the faulty-system determination result from the fault determination means 31. The switching means 42 selects and inputs the phase-current detection value I2*dtc* of the normal winding driving system to the fault-case normal-side current control means 35.

The operation of the fault-case normal-side current control means 35 is the same as the operation performed when the open-type fault is detected. The fault-case normal-side current control means 35 also corrects the torque-current command value so as to generate a torque for cancelling the brake torque generated in the faulty winding driving system, that is, the first winding driving system.

The fault-case normal-side current control means 35 hereinafter uses the corrected torque-current command value and the phase-current detection value I2*dtc* of the normal winding driving system to perform the same dq control as that performed by the normal-case current control means 32 and 33. Then the fault-case normal-side current control means 35 calculates the fault-case normal-side phase-voltage command Vn* so that the q-axis current of the normal winding driving system follows the corrected torque-current command value.

The fault-case normal-side phase-voltage command Vn* is input as the phase-voltage command V2* of the normal winding driving system to the switching-element driving means of the normal winding driving system through the switching means 39.

Next, the effects provided by the current control means 23A of the motor controller according to the second embodiment of the present invention are specifically described.

As illustrated in FIG. 3, the fault-case normal-side current control means 35 is provided in the current control means 23A. In the case of a fault (in the case of an open-type fault and in the case of a bridging-type fault), the torque-current command value of the normal winding driving system is corrected by the torque-current command-value correction means.

As a result, when the torque-current command value has a margin with respect to the rated current of the winding driving systems, the torque-current command value of the normal winding driving system is corrected by the amplification with an amplification factor G ($\geq 1$) in accordance with the degree of margin with respect to the rated current. In this manner, the current close to the total torque-current request value Iqsum* during the normal operation before the occurrence of the fault can be realized in the normal one of the winding driving systems.

On the other hand, when the torque-current command value of the normal winding driving system does not have a margin with respect to the rated current of the winding driving systems, the torque-current command value of the normal winding driving system is corrected to be decreased with an amplification factor G ($<1$) in accordance with the small degree of margin. In this manner, the motor torque of the normal winding driving system can be used to the maximum extent within the range of the rated current.

Next, the case where the motor controller including the current control means 23A according to the second embodiment (FIG. 2) of the present invention is used for the electric power steering device is described as an example.

In the electric power steering device, the largest motor assist torque is required at the time of steering when a vehicle speed is zero. As a result, the motor current (winding current) reaches a current close to the rated current. On the other hand, in the range where the vehicle speed is high, there is a tendency that the assist torque is reduced to be small. As a result, the motor current becomes smaller than the rated current. Therefore, there is a margin with respect to the rated current.

Thus, in the range where the vehicle speed is low, which includes the vehicle speed of zero, the torque-current command value of the normal winding driving system is decreased with the amplification factor G ($<1$) in accordance with the degree of margin so that the assist torque close to that generated during the normal operation is generated within the range which does not exceed the rated current. As a result, the assist torque close to that generated during the normal operation can be continuously generated within the range which does not exceed the rated current.

On the other hand, in the range where the vehicle speed is high, the torque-current command value of the normal winding driving system is amplified with the amplification factor G ($\geq 1$) in accordance with the degree of margin so that the assist torque close to that generated during the normal operation is generated within the range which does not exceed the rated current. As a result, the assist torque close to that generated during the normal operation can be continuously generated within the range which does not exceed the rated current.

For example, when the amplification factor G is set to 2, the assist torque equal to that generated during the normal operation can be continuously generated only by the normal winding driving system.

Further, the torque for cancelling the brake torque generated in the faulty winding driving system is generated by using the normal winding driving system. Therefore, the torque pulsation can be reduced.

As a result, when the motor controller according to the second embodiment of the present invention is used for the motor control in the electric power steering device, the feeling of discomfort caused by the transmission of the torque pulsation to the driver can be prevented.

Although the configuration example in which the two winding driving systems each including the three-phase windings are provided has been described above, the configuration is not limited thereto. The number of winding driving systems may be three or more, and the winding configuration may have four or more phases.

For example, when a fault occurs in an n-phase of m systems, the amplification factor G of the normal system is set to m/(m−n) so as to continue the current control in the normal m−n system. As a result, the motor torque similar to that generated during the normal operation can be generated.

Specifically, by setting the amplification factor G within the range of 0≤G≤m/(m−n) based on the rated current so as to correct the torque-current command value of the normal winding driving system, the motor torque close to that generated during the normal operation can be realized within the range which does not exceed the rated current.

The means for correcting the torque-current command value in the fault-case normal-side current control means 35 is not limited to the use of the torque-current command-value correction means.

For example, current limiting means (not shown) for limiting the magnitude of a current to an allowable current value in the normal-case current control means 32 and 33 and the fault-case normal-side current control means 35 may be provided so as to change the allowable current value of the fault-case normal-side current control means 35 with respect to the normal-case current control means 32 and 33. As a result, the maximum value of the current of the normal winding driving system can be reliably suppressed to be equal to or smaller than the allowable current value.

Moreover, both the torque-current command-value correction means and the current control means 23A may be used. As a result, the motor torque close to that generated during the normal operation can be realized, while the maximum value of the current of the normal winding driving system is reliably suppressed to be equal to or smaller than the allowable current value.

Further, when the motor controller according to the second embodiment of the present invention is used for the motor control performed for the electric power steering device, the total torque-current request value Iqsum* is set as a map value based on the vehicle speed and the detection value of the torque sensor (not shown) provided to the steering shaft. The map is generally referred to as an assist map.

In this case, the assist map may be corrected when the open fault in any of the winding driving systems is detected.

For example, by correcting the assist map with the amplification factor G set in accordance with the vehicle speed, the assist torque closer to that generated during the normal operation can be continuously generated appropriately in accordance with the vehicle speed within the range which does not exceed the rated current.

As described above, the current control means 23A according to the second embodiment (FIG. 3) of the present invention includes the fault-case normal-side current control means 35, which has the torque-current command-value correction means. By setting the amplification factor G for correction to 1 or larger when the fault is detected by the fault determination means 31, the current to be supplied to each of the windings of the normal winding driving system is set to a value larger than the current value during the normal operation.

By amplifying the torque-current command value of the normal winding driving system as described above, the motor torque can be used to the maximum extent within the range of the rated current of the normal one of the winding driving systems.

By setting the amplification factor G for correction to a value smaller than 1 when the fault is detected by the fault determination means 31, the fault-case normal-side current control means 35 included in the current control means 23A sets the current to be supplied to each of the windings of the normal winding driving system to be equal to or smaller than the current value during the normal operation.

As described above, when a fault occurs, the torque-current command value of the normal winding driving system is decreased to reduce the current to be supplied to each of the windings of the normal winding driving system. As a result, the motor torque can be used to the maximum extent within the range of the rated current of the normal one of the winding driving systems.

Third Embodiment

Although not specifically referred to in the second embodiment (FIG. 3) described above, the fault-case normal-side current control means 35, which is included in the current control means 23A, may add a pulsating component at a low level or a high frequency to the current to be supplied to each of the windings of the normal winding driving system when a fault is detected by the fault determination means 31.

A third embodiment of the present invention, in which the pulsating component is added to the current to be supplied to each of the windings of the normal winding driving system, is hereinafter described referring to FIG. 3.

In this case, pulsation adding means for adding the pulsating component to the controlled current of the normal winding driving system can be provided, for example, in the fault-case normal-side current control means 35 of FIG. 3.

Specifically, in FIG. 3, a small pulsation at such a level as not to give a feeling of discomfort in steering to the driver but as to be perceived by the driver is added to the fault-case normal-side command current (Iq1* or Iq2*) input to the fault-case normal-side current control means 35, thereby obtaining a new fault-case faulty-side command current.

As the pulsation, a pulsation expressed in a time function is used so that the pulsating period and amplitude are adjusted within the range in which the driver does not feel discomfort in steering and the driver can perceive the pulsation.

The configuration described above can let the driver know the occurrence of the open-type fault or the bridging-type fault.

For example, when the motor controller according to the first and second embodiments described above is used for the electric power steering device, the pulsation is prevented from occurring in the faulty winding driving system in the case of the open-type fault so that the control is continued by the normal winding driving system. Therefore, there arises a possibility that the driver cannot recognize the occurrence of the open-type fault.

When the motor controller according to the third embodiment of the present invention is used for the electric power steering device, however, the driver can perceive the occurrence of the fault without particularly feeling discomfort. The same effects can be provided even for the bridging-type fault.

In the above description, the pulsating torque at a minute level is added as the method for letting the driver know the occurrence of the fault. However, the method for letting the driver know the occurrence of the fault is not limited thereto. For example, a pulsation at a high frequency (50 Hz or higher) in a short period may be added instead.

In this case, for a steering wheel to be steered by the driver, the pulsating torque is sufficiently attenuated to the level which cannot be perceived by the driver as the pulsating torque. However, the driver can perceive the pulsation by noise sound generated by the pulsation.

According to the configuration described above, a buzzer is not required when sound is used as the method for letting the driver know the occurrence of the fault. Therefore, cost can be reduced.

As described above, when the fault is detected, the fault-case normal-side current control means 35 included in the current control means 23A according to the third embodiment (FIG. 3) of the present invention adds the pulsating component at the high frequency (50 Hz or higher) to the current to be supplied to each of the windings of the normal winding driving system.

Thus, when the motor controller is used for the electric power steering device, the driver can perceive the fault without feeling discomfort. Moreover, equipment such as the buzzer is not required. Therefore, fault notification means can be realized with the configuration at low cost.

Fourth Embodiment

In the second and third embodiments (FIG. 3) described above, the fault-case normal-side phase-voltage command Vn* is computed in the fault-case normal-side current control means 35 by using the dq control similar to that performed in the normal-case current control means 32 and 33. However, a current control method different from the dq control performed in the normal-case current control means 32 and 33 may be used.

A fourth embodiment of the present invention, in which the current to be supplied to each of the windings of the normal winding driving system is determined by using a current control method different from the dq control, is hereinafter described referring to FIG. 3.

In this case, the fourth embodiment differs from the second and third embodiments described above in that the fault-case normal-side current control means 35 uses a current control method different from that used in the normal-case current control means 32 and 33.

The fault-case normal-side current control means 35 computes the fault-case normal-side phase-voltage command Vn* (fault-case voltage command) by using individual control for each of the phases as the current control method.

Specifically, the fault-case normal-side current control means 35 converts the torque-current command value of the normal winding driving system into the torque-current command value of each of the phases to compute the fault-case normal-side phase-voltage command Vn* so that the phase-current detection value follows the torque-current command value of each of the phases.

As a result, the control can be individually performed for each of the phases, and therefore the fault can be easily detected for each of the phases. Thus, there is provided the effect of easily detecting a secondary fault occurring in the normal winding driving system during the control on the normal winding driving system after the occurrence of the open-type fault.

As described above, the fault-case normal-side current control means 35 included in the current control means 23A according to the fourth embodiment (FIG. 3) of the present invention outputs the fault-case voltage command suitable for the case of occurrence of the fault to the inverter corresponding to the windings of the normal winding driving system so that the fault-case voltage command is used as the voltage command to the inverter corresponding to the windings of the normal winding driving system when the fault is detected by the fault determination means 31.

As described above, for the control on the normal winding driving system after the occurrence of the open-type fault, the control is individually performed for each of the phases by using the fault-case normal-side phase-voltage command Vn* (fault-case voltage command) which allows the phase-current detection value to follow the torque-current command value of each of the phases. As a result, the fault can be easily detected for each of the phases. Therefore, at the time of occurrence of the open-type fault, the secondary fault, which occurs in the normal winding driving system, can be easily detected.

Fifth Embodiment

The motor controller 10 without requiring the power relays has been described above in the first to fourth embodiments (FIGS. 1 to 3). However, a motor controller 10B may have a configuration in which power relays 43 and 44 are respectively inserted between the power source 4 and the inverter 21 and between the power source 4 and the inverter 22 as illustrated in FIG. 4.

Figure 4:
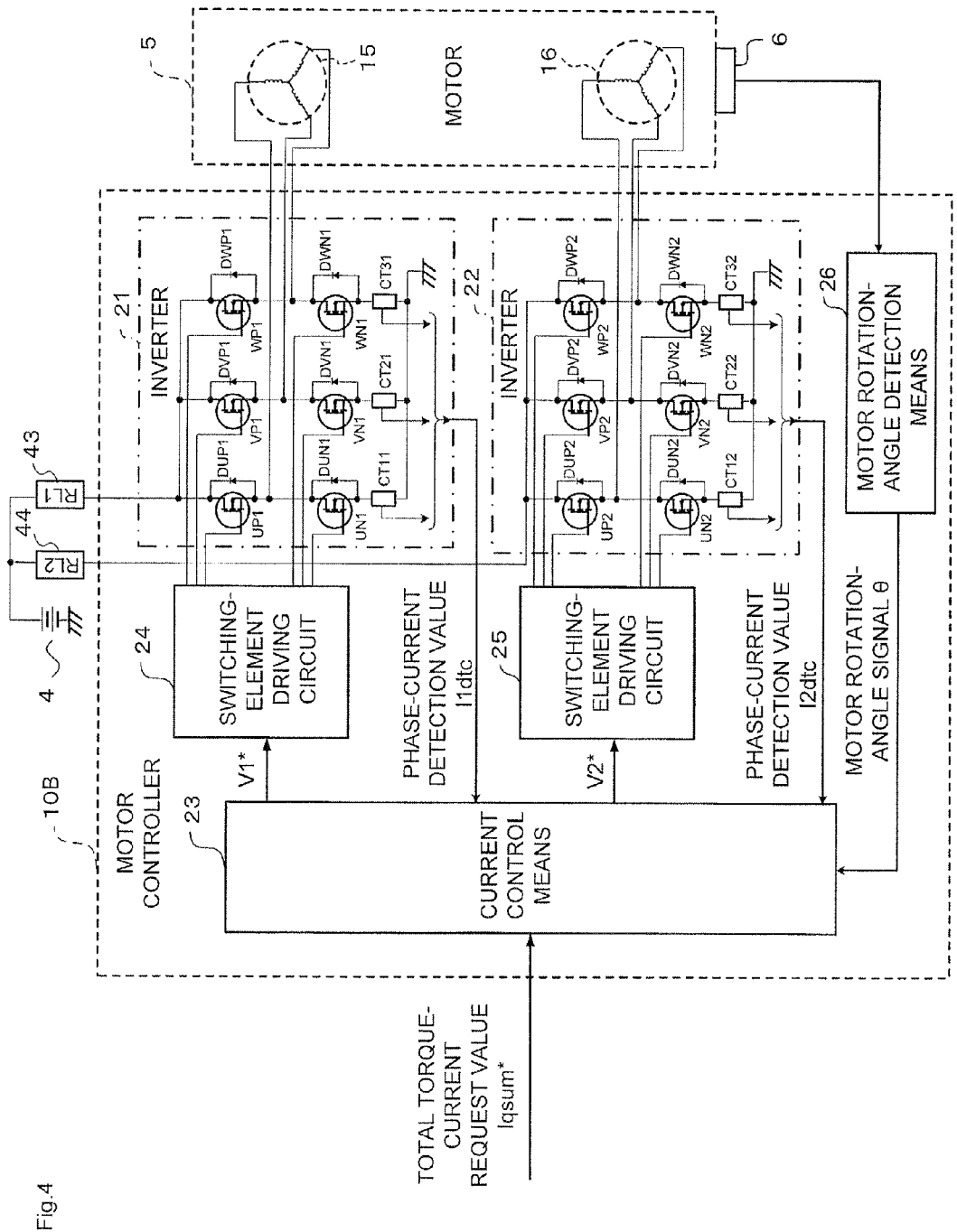
FIG. 4 is a block diagram schematically illustrating an overall configuration of a motor controller according to a fifth embodiment of the present invention.

FIG. 4 is a block diagram schematically illustrating an overall configuration of the motor controller 10B according to a fifth embodiment of the present invention. The components similar to those described above (see FIG. 1) are denoted by the same reference symbols or the same reference symbols followed by "B", and the detailed description thereof is herein omitted.

In this case, between the power source 4 and the motor controller 10B, the configuration illustrated in FIG. 4 differs from that illustrated in FIG. 1 in that the power relay 43 is inserted between the power source 4 and the inverter 21 and the power relay 44 is inserted between the power source 4 and the inverter 22.

Although a functional configuration of the current control means 23 included in the motor controller 10B is as illustrated in FIG. 2, the functional configuration of the current control means 23 may be the same as the configuration of the current control means 23A illustrated in FIG. 3.

In this case, however, the current control means 23 includes power-relay opening means (not shown) for performing control to open only any one of the power relays 43 and 44.

The power-relay opening means included in the current control means 23 performs the control to open only one of the power relays 43 and 44 which corresponds to the faulty winding driving system, in accordance with the result of determination by the fault determination means 31.

Specifically, when the fault determination means 31 (see FIG. 2) included in the current control means 23 detects the open-type fault or the bridging-type fault, the power-relay opening means opens the power relay of the faulty winding driving system to interrupt the supply of the current.

The power relays 43 and 44 may also be provided between the inverter 21 and the motor 5 (windings) and between the inverter 22 and the motor 5 (windings). Even with this configuration, the current supply can be interrupted by the same control for opening the power relay.

With the circuit configuration illustrated in FIG. 4, when the occurrence of the open-type fault or the bridging-type fault is detected, a process for changing the current control method for the faulty winding driving system (fourth embodiment) is not required. The current can be interrupted by simple software to suppress the torque pulsation.

Moreover, even if the fault determination means 31 erroneously determines the occurrence of the open-type fault when the bridging-type fault has actually occurred, the circuit from the power source 4 to the motor 5 (windings) is opened by the operation of interrupting any one of the power relays 43 and 44. Therefore, the current can be reliably interrupted to suppress the torque pulsation.

In addition to the opening of the power relays of the faulty winding driving system at the time of detection of the open-type fault, each of the phase currents of the faulty winding driving system may be controlled to zero by controlling the switching elements similarly to the first embodiment described above.

In this manner, as compared with the conventional devices in which the current supply is interrupted only by the power relays, the current supply to each of the phases of the faulty winding driving system can be set to zero even against the secondary fault such as a stuck fault of the power relay by controlling the switching elements. Therefore, the torque pulsation can be suppressed.

As described above, the motor controller 10B according to the fifth embodiment (FIG. 4) of the present invention includes the power relay 43 inserted between the power source 4 and the inverter 21 and the power relay 44 inserted between the power source 4 and the inverter 22 (or between the winding set 15 and the inverter 21 and between the winding set 16 and the inverter 22), which are inserted individually for the plurality of systems.

The current control means 23 includes the power-relay opening means for performing control to open one of the power relays 43 and 44 which corresponds to the windings of the faulty winding driving system, in response to the detection of the fault by the fault determination means 31. When the fault is detected by the fault determination means 31, any of the power relays 43 and 44 is brought into an open state. In this manner, the supply of the currents to the windings of the faulty winding driving system is stopped.

As a result, the duplication of the method for interrupting the current supply can be realized. Therefore, the reliability can be improved.

Moreover, even when the motor controller 10B including the power relays 43 and 44 is used for the electric power steering device, the reliability can be improved by duplicating the method for interrupting the current supply.

Moreover, if the duplication is intended to be realized only by the power relays, the number of power relays required to be provided is twice as large as that required in FIG. 4, which leads to a complex configuration and higher cost. According to the fifth embodiment of the present invention, however, the number of components can be reduced to realize the duplication at low cost in small size in a simple manner.

Further, the power relays may be provided between the winding set 15 and the inverter 21 and between the winding set 16 and the inverter 22. In this case, the method for interrupting the current supply can be similarly duplicated to improve the reliability.

Sixth Embodiment

In the first to fifth embodiments (FIGS. 1 to 4) described above, attention is focused only on the motor controller 10, and a specific configuration of the electric power steering device using the motor controller 10 is not referred to. However, the electric power steering device may be configured as illustrated in FIG. 5.

Figure 5:
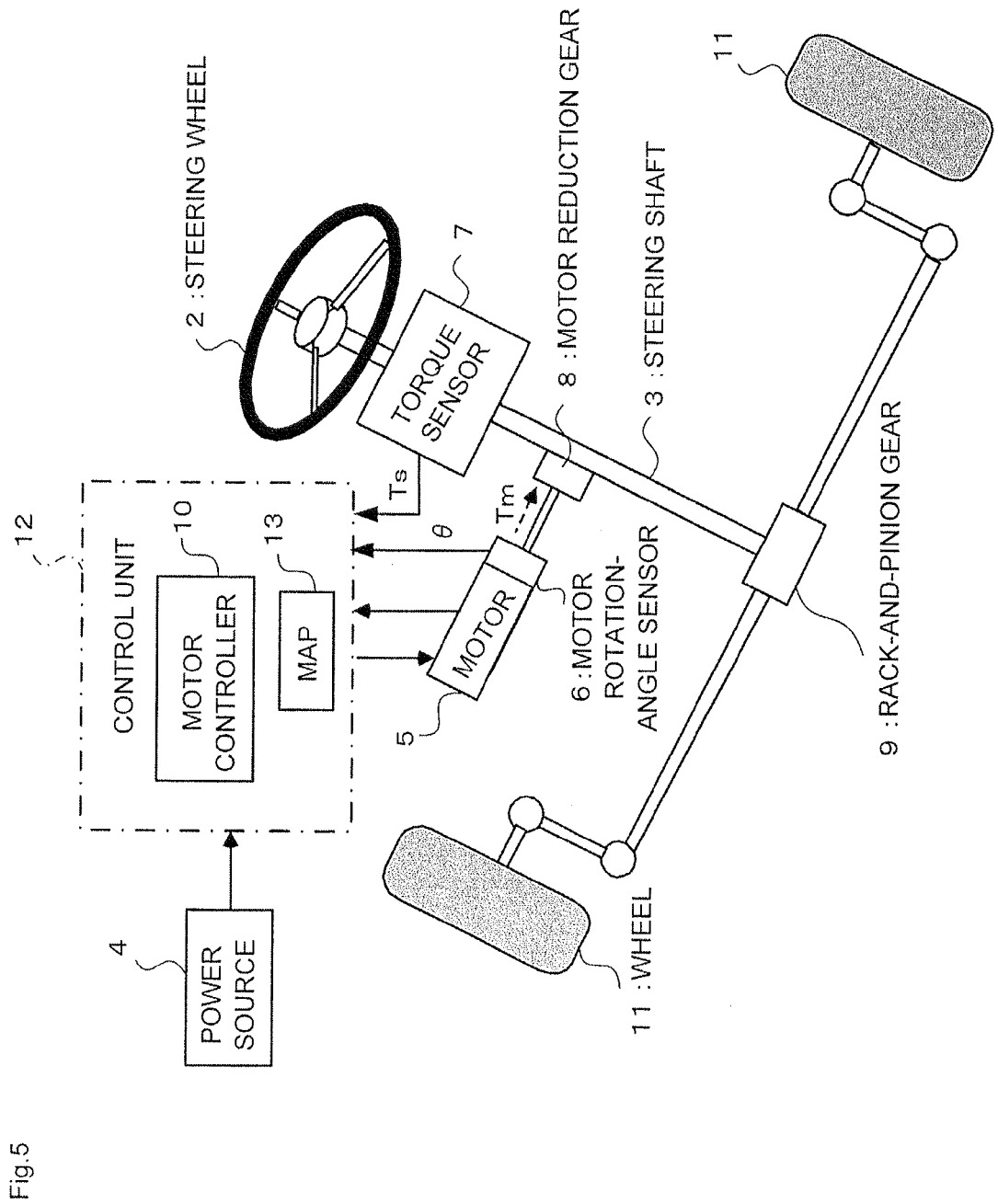
FIG. 5 is a block configuration diagram schematically illustrating an electric power steering device according to a sixth embodiment of the present invention.

FIG. 5 is a block configuration diagram schematically illustrating the electric power steering device according to a sixth embodiment of the present invention. The same components as those described above (see FIG. 1) are denoted by the same reference symbols.

In this case, the motor 5 is used for a steering assist motor, and the motor controller 10 is used for an electric power steering device for a vehicle. As the motor controller 10, any of those described above in the first to fifth embodiments may be used.

In FIG. 5, the electric power steering device includes the motor 5 for generating a motor torque Tm (assist force), the motor rotation-angle sensor 6, the power source 4, a steering wheel 2 to be operated by a driver of the vehicle, a steering shaft 3 coupled to the steering wheel 2, a torque sensor 7 for detecting a steering torque Ts applied by the driver to the steering wheel 2, a motor reduction gear 8 provided between the motor 5 and the steering shaft 3, a rack-and-pinion gear 9 provided at a distal end of the steering shaft 3, right and left wheels 11 to which the steering force is transmitted from the steering shaft 3 through the rack-and-pinion gear 9, and a control unit 12 for controlling the motor 5 based on a state quantity of the motor 5 and input information from the respective sensors 6 and 7.

When the driver steers the steering wheel 2, the torque sensor 7 detects the steering torque Ts applied from the steering wheel 2 to the steering shaft 3 and inputs the detected steering torque Ts to the control unit 12.

The motor rotation-angle sensor 6 inputs a detection value of the rotation angle of the motor to the control unit 12.

The detection value of the rotation angle of the motor is input to the motor controller 10 (see FIGS. 1 and 4) included in the control unit 12 to become the motor rotation-angle signal θ. The motor rotation-angle signal θ is used to determine the three-phase voltage command V* in the current control means 23 and to compute a motor rpm ω as in the case described above.

The control unit 12 includes the motor controller 10 and a map 13 for calculating the torque-current command (q-axis current command Iq*) corresponding to a target value of the motor torque Tm based on the steering torque Ts.

The map 13 included in the control unit 12 stores in advance a target value of the motor torque Tm to be output from the motor 5. The map 13 determines the direction and the magnitude of the motor torque Tm in accordance with the steering torque Ts output from the torque sensor 7 to calculate the torque-current command for controlling the motor 5.

The steering torque Ts applied to the steering wheel 2 by the driver is transmitted from the steering shaft 3 through the rack-and-pinion gear 9 to a rack to steer the wheels 11.

The motor 5 is coupled to the steering shaft 3 through the motor reduction gear 8. The assist force (motor torque Tm) generated from the motor 5 is transmitted to the steering shaft 3 through the motor reduction gear 8 to act so as to reduce the steering torque Ts to be applied by the driver at the time of steering.

The motor controller 10 included in the control unit 12 determines the direction and the magnitude of a target assist force to be output by the motor 5 from the map 13 in accordance with the steering torque Ts output from the torque sensor 7 and controls the current to be supplied from the power source 4 to the motor 5 so as to generate the target assist force.

Specifically, the motor controller 10 controls the current flowing through the motor 5 so as to realize the torque-current command (q-axis current command Iq*).

By this current, an assist force equal to the target assist force is generated from the motor 5.

In the electric power steering devices illustrated in FIGS. 1 and 4, if the control is immediately stopped in the case of a fault while the vehicle is running, the degree of discomfort felt by the driver becomes greater. Therefore, it is desired to reduce the feeling of discomfort by continuing the control as much as possible.

Therefore, in the control unit 12, when the occurrence of some fault is detected by the fault determination means 31, the current control means 23 included in the motor controller 10 specifies a portion in which the fault has occurred and the content of the fault within a short period of time so as to continue good control as much as possible and performs the control on the motor 5 in accordance with the portion in which the fault has occurred and the content of the fault.

For example, when the open-state fault is specified in the U-phase of the motor 5, the control on the motor 5 is continued by controlling the currents only for the other V-phase and W-phase.

Moreover, by specifying the portion in which the fault has occurred and the content of the fault within a short period of time, the control can be quickly switched to another control corresponding to the state of fault after the occurrence of the fault.

As described above, the electric power steering device according to the sixth embodiment (FIG. 5) of the present invention includes the control unit 12 including the motor controller 10 described above, the power source 4 for supplying power to the control unit 12, the steering wheel 2 to be operated by the driver of the vehicle, the steering shaft 3 coupled to the steering wheel 2, the torque sensor 7 for detecting the steering torque Ts to be applied from the steering wheel 2 to the steering shaft 3, and the motor 5 which is connected to the steering shaft 3 and which generates the motor torque Tm (assist force) for reducing the steering torque Ts.

The control unit 12 controls the current of the motor 5 so as to generate the target assist force based on the detection value of the steering torque Ts and continues the control on the motor 5 by the control in accordance with the detected content of the fault when the open fault is detected in the path from the motor controller 10 to the motor 5.

As a result, for example, the fault which brings one of the phases of the motor 5 in the open state can be precisely specified within a short period of time. Therefore, the control can be precisely switched to the control corresponding to the fault state. Therefore, the degree of discomfort felt by the driver can be reduced.

What is claimed is:

1. A motor controller for controlling a current supplied from and a voltage applied from a power source with respect to a motor including a plurality of systems of winding sets, each of the winding sets including a plurality of phases of windings, the motor controller comprising:
   inverters of the plurality of systems, each of the inverters including a plurality of switching elements for controlling voltages applied to the respective plurality of phases of the winding sets of the plurality of systems, so as to control currents supplied from the power source to the respective plurality of phases of the winding sets of the plurality of systems; and
   current control means for generating a plurality of sets of voltage commands corresponding to the applied voltages respectively for the inverters of the plurality of systems, so as to control the currents to be caused to flow in the respective plurality of phases of the winding sets of the plurality of systems, wherein:
   the current control means includes fault determination means for detecting one of disconnection of any one of wirings in the plurality of phases of the winding sets of the plurality of systems and in the inverters of the plurality of systems and an open fault occurring in any one of the plurality of switching elements and for determining whether a fault occurring in any one of the windings and the inverters is an open-type fault or a bridging-type fault when the fault is detected; and
   when the fault determination means determines that the fault is the open-type fault, the current control means stops the supply of the currents to the windings of one of the plurality of systems in which the open-type fault has occurred, and continues the supply of the currents to the windings of a normal one of the plurality of systems in which the open-type fault has not occurred;
   wherein, when the fault determination means determines that the fault is the open-type fault, the current control means stops supply of currents to the windings of the one of the plurality of systems, in which the open-type fault has occurred, by one of turning OFF the plurality of switching elements of one of the inverters of the one of the plurality of systems, in which the open-type fault has occurred, and controlling the currents flowing through the windings of the one of the plurality of systems, in which the open-type fault has occurred, to be zero.

2. An electric power steering device, comprising:
   a control unit including the motor controller according to claim 1;
   a power source for supplying power to the control unit;
   a steering wheel to be operated by a driver of a vehicle;
   a steering shaft coupled to the steering wheel;
   a torque sensor for detecting a steering torque applied from the steering wheel to the steering shaft; and
   a motor connected to the steering shaft, for generating an assist force for reducing the steering torque, wherein:
   the control unit controls a current of the motor so as to generate a target assist force based on a detection value of the steering torque; and
   when an open fault occurring in a path from the motor controller to the motor is detected, the control unit continues the control on the motor.

3. An electric power steering device, comprising:
   a control unit including the motor controller according to claim 1;
   a power source for supplying power to the control unit;
   a steering wheel to be operated by a driver of a vehicle;
   a steering shaft coupled to the steering wheel;
   a torque sensor for detecting a steering torque applied from the steering wheel to the steering shaft; and
   a motor connected to the steering shaft, for generating an assist force for reducing the steering torque, wherein:
   the control unit controls a current of the motor so as to generate a target assist force based on a detection value of the steering torque; and
   when an open fault occurring in a path from the motor controller to the motor is detected, the control unit continues the control on the motor.

4. A motor controller according to claim 1, wherein, when the fault determination means determines that the fault is the bridging-type fault, the current control means makes an instruction to turn OFF at least switching elements corresponding to a phase in which the bridging-type fault has occurred.

5. An electric power steering device, comprising:
   a control unit including the motor controller according to claim 4;
   a power source for supplying power to the control unit;
   a steering wheel to be operated by a driver of a vehicle;
   a steering shaft coupled to the steering wheel;
   a torque sensor for detecting a steering torque applied from the steering wheel to the steering shaft; and
   a motor connected to the steering shaft, for generating an assist force for reducing the steering torque, wherein:
   the control unit controls a current of the motor so as to generate a target assist force based on a detection value of the steering torque; and
   when an open fault occurring in a path from the motor controller to the motor is detected, the control unit continues the control on the motor.

6. A motor controller according to claim 1, further comprising power relays provided one of between the power source and the inverters and between the winding sets and the inverters, the power relays being individually inserted respectively for the plurality of systems, wherein:
   the current control means includes power-relay opening means for performing control to open one of a plurality of the power relays which corresponds to the windings of the one of the plurality of systems, in which the fault has occurred, in response to the detection of the fault by the fault determination means; and
   when the fault is detected by the fault determination means, the power-relay opening means stops supply of currents to the windings of the one of the plurality of systems, in which the fault has occurred, by bringing any one of the plurality of the power relays into an open state.

7. An electric power steering device, comprising:
   a control unit including the motor controller according to claim 6;
   a power source for supplying power to the control unit;
   a steering wheel to be operated by a driver of a vehicle;
   a steering shaft coupled to the steering wheel;
   a torque sensor for detecting a steering torque applied from the steering wheel to the steering shaft; and
   a motor connected to the steering shaft, for generating an assist force for reducing the steering torque, wherein:
   the control unit controls a current of the motor so as to generate a target assist force based on a detection value of the steering torque; and when an open fault occurring in a path from the motor controller to the motor is detected, the control unit continues the control on the motor.

8. A motor controller according to claim 1, wherein, when the fault is detected by the fault determination means, the current control means sets a current value of the current to be supplied to each of the windings of the normal one of the plurality of systems to a value larger than a current value during a normal operation.

9. An electric power steering device, comprising:
a control unit including the motor controller according to claim 8;
a power source for supplying power to the control unit;
a steering wheel to be operated by a driver of a vehicle;
a steering shaft coupled to the steering wheel;
a torque sensor for detecting a steering torque applied from the steering wheel to the steering shaft; and
a motor connected to the steering shaft, for generating an assist force for reducing the steering torque, wherein:
the control unit controls a current of the motor so as to generate a target assist force based on a detection value of the steering torque; and
when an open fault occurring in a path from the motor controller to the motor is detected, the control unit continues the control on the motor.

10. A motor controller according to claim 1, wherein, when the fault is detected by the fault determination means, the current control means sets a current value of the current to be supplied to each of the windings of the normal one of the plurality of systems to a value equal to or smaller than a current value during a normal operation.

11. An electric power steering device, comprising:
a control unit including the motor controller according to claim 10;
a power source for supplying power to the control unit;
a steering wheel to be operated by a driver of a vehicle;
a steering shaft coupled to the steering wheel;
a torque sensor for detecting a steering torque applied from the steering wheel to the steering shaft; and
a motor connected to the steering shaft, for generating an assist force for reducing the steering torque, wherein:
the control unit controls a current of the motor so as to generate a target assist force based on a detection value of the steering torque; and
when an open fault occurring in a path from the motor controller to the motor is detected, the control unit continues the control on the motor.

12. A motor controller according to claim 1, wherein, when the fault is detected by the fault determination means, the current control means adds a pulsating component to the current to be supplied to each of the windings of the normal one of the plurality of systems.

13. An electric power steering device, comprising:
a control unit including the motor controller according to claim 12;
a power source for supplying power to the control unit;
a steering wheel to be operated by a driver of a vehicle;
a steering shaft coupled to the steering wheel;
a torque sensor for detecting a steering torque applied from the steering wheel to the steering shaft; and
a motor connected to the steering shaft, for generating an assist force for reducing the steering torque, wherein:
the control unit controls a current of the motor so as to generate a target assist force based on a detection value of the steering torque; and
when an open fault occurring in a path from the motor controller to the motor is detected, the control unit continues the control on the motor.

14. A motor controller according to claim 1, wherein:
the current control means includes fault-case normal-side current control means for outputting a fault-case voltage command suitable for a case of occurrence of the fault to one of the inverters which corresponds to the windings of the normal one of the plurality of systems; and
when the fault is detected by the fault determination means, the fault-case voltage command is used as the voltage command to the one of the inverters which corresponds to the windings of the normal one of the plurality of systems.

15. An electric power steering device, comprising:
a control unit including the motor controller according to claim 14;
a power source for supplying power to the control unit;
a steering wheel to be operated by a driver of a vehicle;
a steering shaft coupled to the steering wheel;
a torque sensor for detecting a steering torque applied from the steering wheel to the steering shaft; and
a motor connected to the steering shaft, for generating an assist force for reducing the steering torque, wherein:
the control unit controls a current of the motor so as to generate a target assist force based on a detection value of the steering torque; and
when an open fault occurring in a path from the motor controller to the motor is detected, the control unit continues the control on the motor.

* * * * *